US007833623B2

(12) United States Patent
Humphrey, Jr. et al.

(10) Patent No.: US 7,833,623 B2
(45) Date of Patent: Nov. 16, 2010

(54) MODIFIED SLUSH MOLDABLE TPU FOR INSTRUMENT PANELS WITH SEAMLESS AIRBAG DEPLOYMENT CAPABILITY

(75) Inventors: William McHugh Humphrey, Jr., Dover, NH (US); Paul Joseph Drago, Rochester, NH (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 0 days.

(21) Appl. No.: 12/103,526

(22) Filed: Apr. 15, 2008

(65) Prior Publication Data

US 2009/0256276 A1 Oct. 15, 2009

(51) Int. Cl.
*B32B 27/40* (2006.01)
*B32B 27/32* (2006.01)

(52) U.S. Cl. .................. 428/339; 264/45.4; 528/48; 428/301.4; 428/319.9

(58) Field of Classification Search .................. 428/339, 428/301.4, 319.9; 264/45.4; 528/48
See application file for complete search history.

(56) References Cited

U.S. PATENT DOCUMENTS 5,824,738 A 10/1998 Humphrey et al.
6,187,859 B1 2/2001 Humphrey et al.
6,410,638 B1 6/2002 Kaufhold et al.
6,896,962 B1 5/2005 Valligny et al.
7,030,189 B2* 4/2006 Masubuchi .................. 525/125
2004/0092699 A1* 5/2004 Ueno et al. .................... 528/66
2008/0233376 A1* 9/2008 Weaver ........................ 428/219

FOREIGN PATENT DOCUMENTS

JP 2001 207051 A 7/2001
WO WO 2007033115 A1 * 3/2007

OTHER PUBLICATIONS http://catalog.ides.com/DocSelect.aspx?I=89733&E=109381&DOC=DOWTDS&DS=123&DK=STD&DC=en, pp. 1-2.*
http://www.dow.com/versify/prod/index.htm, Feb. 13, 2007.*
http://catalog.ides.com/DocSelect.aspx?I=68651&E=92201&DOC=DOWTDS&DS=123&DK=STD&DC=en, Feb. 13, 2007.*

* cited by examiner

*Primary Examiner*—Satya B Sastri
(74) *Attorney, Agent, or Firm*—Brooks Kushman P.C.

(57) ABSTRACT

A vehicle instrument panel skin comprises residues of a thermoplastic urethane elastomer and a propylene-ethylene copolymer. The thermoplastic urethane elastomer includes a polyol, an organic diisocyanate, an optional chain extender, and an optional hindered amine light stabilizer and a benzotriazole ultraviolet stabilizing agent. A method for forming the instrument panel skin is also provided.

9 Claims, 3 Drawing Sheets

MODIFIED SLUSH MOLDABLE TPU FOR INSTRUMENT PANELS WITH SEAMLESS AIRBAG DEPLOYMENT CAPABILITY

BACKGROUND OF THE INVENTION

1. Field of the Invention

The present invention relates to resins that are useful for making instrument panel skins used in automobile interiors.

2. Background Art

Currently, three manufacturing processes dominate the vehicle instrument panel manufacturing arena. The dominant processes are slush molding, vacuum forming, and spray urethane. Although each process works reasonably well, there are associated issues.

Vacuum formed instrument panels have a hard "hand" and do not perform cleanly (no shredding or sharding) during −30° C. airbag deployment at −30° C. Moreover, long term weathering has shown that these products become brittle. Spray urethane (aliphatic with inherent light stability and aromatic where a coating is required for weatherability) have less desirable "hand." Although the spray urethane exhibits property retention after aging and weathering, these materials also exhibit shredding and sharding during −30° seamless airbag deployment. Slush molding can utilize PVC and TPU elastomers. Although certain modified PVCs have acceptable unpainted "hand" for instrument panels, the same materials tend to exhibit the same shredding and sharding issues during −30° C. seamless airbag deployments.

Accordingly, there is a need for new material for forming vehicle instrument panels having acceptable aesthetic touch properties while exhibit proper function during low temperature airbag deployment.

SUMMARY OF THE INVENTION

The present invention solves one or more problems of the prior art by providing in at least one embodiment an instrument panel skin suitable for automobile interior applications. The instrument panel skin comprises residues of a thermoplastic urethane elastomer and a propylene-ethylene copolymer. Typically, the thermoplastic urethane elastomer includes a polyol, a chain extender, an organic diisocyanate, and a hindered amine light stabilizer and a benzotriazole ultraviolet stabilizing agent. Advantageously, the instrument panels of the present invention exhibit both improved touch characteristics while exhibiting acceptable low temperature airbag deployment characteristics.

In another embodiment, a method for forming the instrument panel skin set forth above is provided. The method of this embodiment includes a step of introducing a urethane-based resin composition and a propylene-ethylene copolymer into a mold tool. Typically, these compositions are in the form of a powder. The urethane based resin includes residues of a composition having polyol, a chain extender, an organic diisocyanate, and a hindered amine light stabilizer and a benzotriazole ultraviolet stabilizing agent. The urethane based resin composition is heated to a sufficient temperature to form a layer over at least a portion of the mold tool. Excess powder is poured from the mold tool and heating continued if necessary. The instrument panel skin is removed from the mold tool.

DETAILED DESCRIPTION OF THE PREFERRED EMBODIMENT(S)

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

Figure 1A:
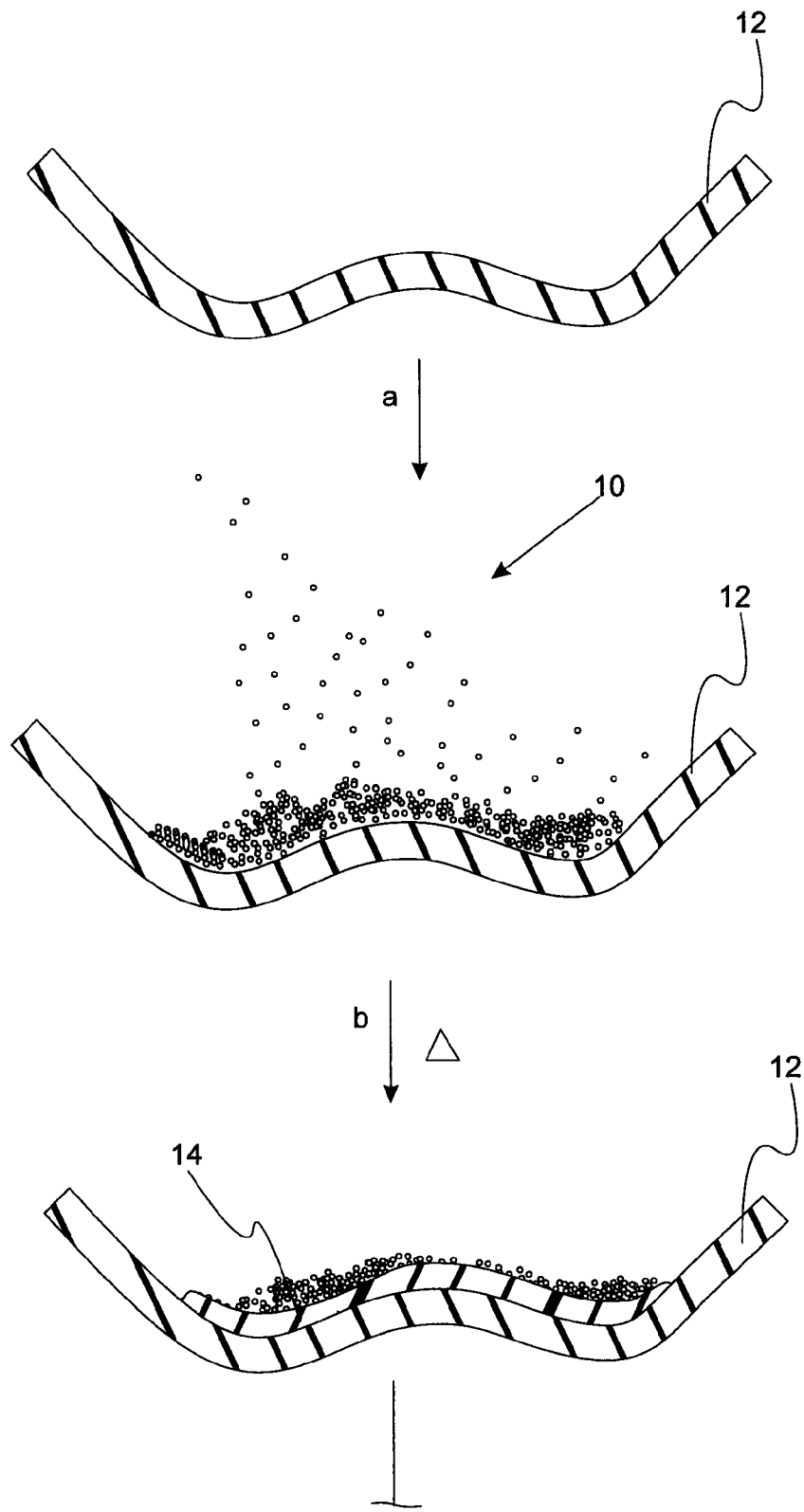
FIGS. 1A and 1B area pictorial flowchart depicting an embodiment for forming an instrument panel skin.
Figure 1B:
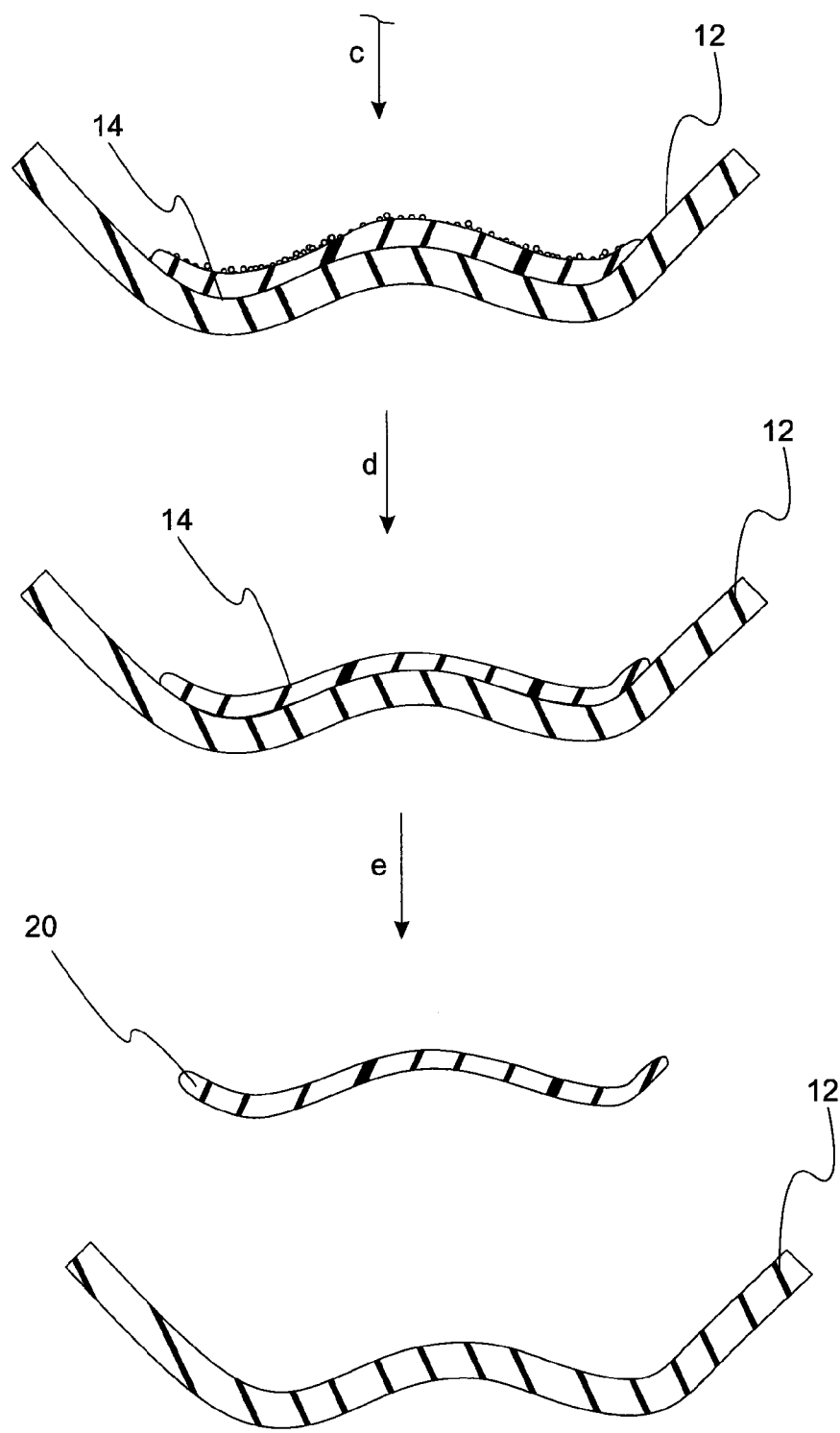

With reference to FIGS. 1A and 1B, a pictorial flowchart depicting a slush molding method for forming an instrument panel skin is provided. The method of this embodiment comprises introducing urethane-based resin composition 10 into mold tool 12. At least a portion of mold tool 12 is made from a metal such as stainless steel or nickel. Urethane-based resin composition 10 comprises a thermoplastic urethane elastomer composition and a propylene-ethylene copolymer. Suitable compositions for the thermoplastic urethane elastomer composition are the light stable aliphatic thermoplastic urethane elastomers set forth in U.S. Pat. Nos. 5,824,738 and 6,187,859. The entire disclosures of these patents are incorporated by reference in their entirety.

In a variation of the present invention, the thermoplastic urethane elastomer includes residues of a composition having a polyol and an organic diisocyanate. In a refinement, the thermoplastic urethane elastomer includes a chain extender. In a further refinement, the urethane base resin further includes a hindered amine light stabilizer and/or a benzotriazole ultraviolet stabilizing agent.

In a subsequent step b), urethane based resin composition 10 is heated to a sufficient temperature to form layer 14 over at least a portion of mold tool 12. In one refinement, urethane based resin composition 10 is heated to a temperature between about 170° C. and 250° C. In step c), powder is poured out from mold tool 12. Mold is further heated if necessary so that all the powder melts. Finally, instrument panel skin 20 is removed from mold tool 12 is step e). Typically, instrument panel skin 20 has a thickness from about 0.5 mm to about 2 mm.

Urethane-based resin composition 10 optionally includes one or more pigments. In a refinement, the pigments are present in an amount from about 0.2 to about 10 weight percent of the total weight of the urethane-based resin composition.

In a variation of the present embodiment, mold tool 12 has a texture surface that contacts urethane-based composition 10 to impart a texture surface onto instrument panel skin 20.

Figure 2:
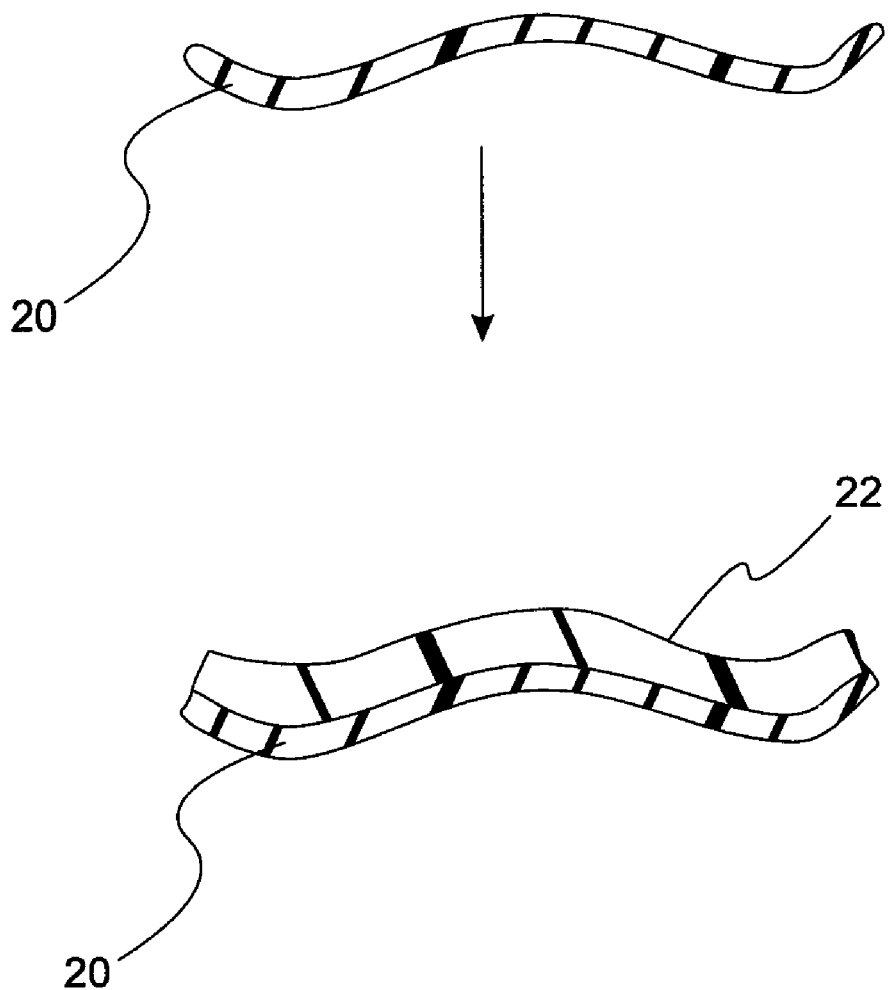
FIG. 2 is a pictorial flowchart depicting the application of a support structure to an instrument panel skin.

With reference to FIG. 2, a flowchart showing the application of a backing to instrument panel skin 20 is provided. In step f), structural component 22 is applied to instrument panel skin 20. Such structural components are applied by any number of methods known to those skilled in the art. In one refinement, structural component 22 has a thickness from about 2 mm to about 20 mm. In some variations, foam resins such as Dow Specflex NM815 are utilized. In one variation, skin 22 may be placed in a mold that provides a predetermined shape and a urethane backing sprayed over the back of instrument panel skin 20. In another variation, structural component 22 can be molded onto instrument panel skin 20. In such circumstances thermoplastic resins may be used.

As set forth above, instrument panel skin 20 comprises the residues of urethane-based resin composition that includes thermoplastic urethane elastomer composition and a propylene-ethylene copolymer. The propylene-ethylene copolymer used in the present embodiment is characterized by a number of physical characteristics. In a refinement, the propylene-ethylene copolymer has a total crystallinity less than about 20%. In another refinement, the propylene-ethylene copolymer has a flexural modulus (1% secant) from about 1500 psi to about 2500 psi and a Shore A hardness from about 40 to about 80 (ISO 898 ASTM D2240). Examples of useful propylene-ethylene copolymers include, but are not limited to the Versify™ line or elastomers commercially available from The Dow Chemical Company. Versify™ 2400 is found to be particularly useful. Typically, the propylene-ethylene copolymer is present in an amount from about 1 to 25 weight percent of the urethane-based composition. In yet another refinement, the propylene-ethylene copolymer is present in an amount from about 5 to 20 weight percent of the urethane-based composition. In still another refinement, the propylene-ethylene copolymer is present in an amount of about 20% weight percent of the urethane-based composition.

The instrument panel skins of the present invention are found to have significant heat stability. In particular, the elongation properties are found to vary by less than 10% after 500 hours aging at 120° C. Moreover, the instrument panel skins maintain sufficient elongation to pass a −30° C. seamless airbag deployment test before and after heat aging 400 hours at 107° C. In a refinement, the instrument panel skins have a combination of low glass transition temperature and retained elongation greater than about 100% after aging for 500 hours at 120° C. Although the operation of the present invention is not limited to any particularly theory, it is believed that the use of the propylene-ethylene copolymer at least partially responsible for these properties.

As set forth above, the thermoplastic skin of the present invention includes the residues of a polyol. Suitable polyols are disclosed in U.S. Pat. Nos. 5,824,738 and 6,187,859. Specific examples, include, but are not limit to polyether polyols. In a variation, the polyol is formed in a process utilizing an organometallic catalyst that results in a polyol having a low level of terminal unsaturation. In one refinement, the polyol has a level of terminal unsaturation less than about 0.04 meq/g. In another refinement, the polyol has a level of terminal unsaturation less than about 0.02 meq/g. A representative example of such a polyol is Poly L 255-28 (sold by Olin corporation, Stamford, Conn.). Poly L 255-28 is a ethylene oxide capped poly (propylene oxide) polyol with an approximate molecular weight of 4000 and a hydroxyl number of 28. The polyol component can be present in amounts ranging from approximately 40% to 70% of the total weight of the thermoplastic urethane elastomer composition. in a refinement, the polyol is present in an amount between 40% and 60% of the total weight of the thermoplastic urethane elastomer composition. The amount of polyol is adjusted in this range to vary the hardness of the elastomer produced.

In a variation of the present embodiment, the thermoplastic urethane elastomer composition includes a chain extending agent. Suitable chain extending agents include aromatic secondary or aliphatic primary or secondary diamines, ethylene glycol, diethylene glycol, propylene glycol, pentane diol, 3-methylpentane-1,5-diol, hexane diol, HQEE [hydroquinone bis(2-hydroxyethyl) ether], CHDM (1,4-cyclohexanedimethanol), and HBPA (hydrogenated bisphenol A). A particularly useful chain extender is 1,4-butanediol. In a refinement, such chain extenders are present in concentrations varying from 6 weight % to 15 weight % of the total weight of the thermoplastic urethane elastomer composition. In another refinement, the chain extenders are present in an amount from 7% to 13% of the total weight of the thermoplastic urethane elastomer composition.

The thermoplastic urethane elastomer composition used in the present embodiment includes one or more isocyanates. Suitable isocyanates include aliphatic organic diisocyanates, or mixture of diisocyanates. Specific examples of organic isocyanates include, but are not limited to, (TMXDI) meta-tetramethylxylene diisocyanate and paratetramethylxylene diisocyanate, isophorone diisocyanate (IPDI), dibenzyl diisocyanate, xylene diisocyanate (XDI), 3,3'-bis toluene-4,4-diisocyanate, hexamethylene diisocyanate (HDI), hydrogenated MDI, hydrogenated XDI, cyclohexane diisocyanate, paraphenylene diisocyanate, mixtures and derivatives thereof and the like. In a refinement, the organic diisocyanates are present in an amount from 20 weight % to 50 weight % of the total weight of the thermoplastic urethane elastomer composition. In another refinement, the organic diisocyanates are present in an amount from 25 weight % to 40 weight % of the total weight of the thermoplastic urethane elastomer composition.

As set forth above, the thermoplastic urethane elastomer composition may include an ultraviolet stabilizing agent. Suitable ultraviolet stabilizing agents may include a combination of a hindered amine light stabilizers (HALS) and a benzotriazole. Examples of HALS include, but are not limited to, bis(1,2,2,6,6-pentamethyl-1-4-piperidinyl)sebacate (Chemical Abstract Number 41556-26-7, also known as Tinuvin 292 or 765 Ciba-Geigy Corp., Hawthorne, N.Y.). Examples of benxotriazoles include hydroxyphenyl benzotriazoles such as a benzotriazole mixture of poly(oxy-1,2-ethanediyl), alpha-[3-[3-(2H-benzotriazol-2-yl)-5-(1,1-dimethylethyl)-4-hydroxyphenyl]-1-oxopropyl]-omega-hydroxy- and poly(oxy-1,2-ethanediyl), alpha-[3-[3-(2H-benzotriazol-2-yl)-5-(1,1-dimethylethyl)-4-hydroxyphenyl]-1-oxopropyl)-omega-[3-[(2H-benzotriazol-2-yl)-5-(1,1,-dimethylethyl)-4-hydroxyphenyl]-1-oxopropoxy)-, Chemical Abstract Number 104810-47-1 and polyethylene glycol with a molecular weight of 300 Chemical Abstract Number 25322-68-3 (also known as Tinuvin 1130 or 213 Ciba-Geigy Corp., Hawthorne, N.Y.) and any other suitable ultraviolet stabilizing agents. In a refinement, the combination of ultraviolet stabilizing agent are present in a ratio in a range of approximately 1:1 to 2:1 by weight. In another variation, the total concentration of ultraviolet stabilizing agents are present in an amount from about 0.5 to 2.0 weight %, of the total weight of the urethane elastomer composition.

In another variation of the present invention, the urethane elastomer composition includes an antioxidant. Virtually any suitable antioxidant, or mixture of antioxidants, may be used in the practice of the present invention. Representative examples include, but are not limited to, Irganox 1010 [tetrakis (methylene(3,5-di-tert-butyl-4-hydroxycinnamate)] methane from Ciba-Geigy; Irganox 1076 [Octodecyl 3,5 di-tert-butyl-4-hydroxyhydrocinnamate] from Ciba-Geigy; Irganox 245 [Ethylenebis(oxyethylene) bis-(3-tert-butyl-4-hydroxy-5-methylhydrocinnamate)] from Ciba-Geigy; and Vanox 830 (a proprietary blend of a phenolic compound, alkylated diphenylamines and trialkyl phosphite from R. T. Vanderbilt). The antioxidants may be present at a total concentration in a range of approximately 0.10 weight % to 1.0 weight % of the total weight of the urethane elastomer composition. In another refinement, the antioxidants may be present at a total concentration in a range of approximately 0.25 weight % to 0.75 weight % of the total weight of the urethane elastomer composition.

The following examples illustrate the various embodiments of the present invention. Those skilled in the art will recognize many variations that are within the spirit of the present invention and scope of the claims.

Table 1 provides the compositions of several test samples that were used to form skin layers via a slush molding process as set forth above. The components are blended together in a Leistritz twin screw extruder. The resulting pellets are cryogenically ground into a powder, dried, and molded into test panels using a Ford random square grain tool. Table 2 provides the properties of skins made from the test compositions. The aacct Elongation at break is after 500 hrs at 120° C.

TABLE 1

Sample compositions

| | Sample No. | | | | | |
|---|---|---|---|---|---|---|
| | 1 | 2 | 3 | 4 | 5 | 6 |
| Bayer Texin DP7-3042 3597478 lot 6236 (TPU composition) | 73.00 | 63.00 | 73.00 | 63.00 | 73.00 | 63.00 |
| Dow Versify 2400 | 20.00 | 30.00 | | | | |
| Dow Versify 3401 | | | 20.00 | 30.00 | | |
| Dow Versify 4200 | | | | | 20.00 | 30.00 |
| Clariant 3T4A Medium Dark Pebble Concentrate (pigment) | 7.00 | 7.00 | 7.00 | 7.00 | 7.00 | 7.00 |
| TOTAL | 100.00 | 100.00 | 100.00 | 100.00 | 100.00 | 100.00 |

TABLE 2

Physical properties.

| Sample No. | Method | Requirements |
|---|---|---|
| Skin Thickness | ISO 4593 AST, D374 Method C | 0.5-2.0 mm or as specified on engineering document |
| Hardness Shore "A" (ASTM D2240) | ISO 898 ASTM D2240 15 s dwell | 80-90 or as specified on engineering document |
| Tear Strength (ASTM D624) kN/M Die C | ISO 34 Method B Proc ASTM D624, Die C, 50 m mm/min | 40 kN/m |
| Tensile Strength at maximum load (d3574 MPa | ISO 527-2 50 mm/min | 25 MPa |
| Elongation at break | ISO 527-2 50 mm/min | 600% |
| Resistance to Heat Aging Color Stability(AATCC color test) | ISO 188 Method B ASTM E145 Type IIA 500 hr 120° C. ISO 105-A02 AATCC Proc. 1 | Rating 3 minimum No tackiness, spewing, or staining. Hue change in the positive delta b should be reported. Spotty or non-uniform staining cause for rejection. Color shift reversals after 16 hrs Xenon acceptable. Topcoated & two-tone tst per 3.8.2 after color & gloss |
| Cold Flexibility | 180° at −20 C. with 19-20 mm mandrel 50 mm × 150 mm | No cracks |
| Elongation at break | ISO 527-1 Type 2 ASTM D638 Mll 100 mm/min remove foam | −5% change from original |
| 3.7.7 Fogging | SAE J1756 3 hr at 100° C., 21° C. cooling, post condition 1 & 16 hrs | 70 minimum N clear film droplest or crystals |
| Resistance to Fade, SAE J1885 | Xenon Arc Weatherometer, min (SAE J1885, ISO 105/A02/AATCC Evaluation Procedure 1 | 1504 kJ/m$^2$ exposure, min Rating 3-4 min |
| Mandrel Bend after 489 kJ | 19-20 mandrel, 180°, remove foam | No cracking, 180° m 19-20 mm mandrel |

TABLE 2-continued

Physical properties.

| | | |
|---|---|---|
| Resistance to Fade | Xenon Arc Weatherometer, min (SAE J1885, ISO 105/A02/AATCC Evaluation Procedure 1 | 1504 kJ/m² exposure, min Rating 3-4 min |
| Mandrel Bend after 1504 kJ | 19-20 mandrel, 180°, remove foam | No cracking, 180° m 19-20 mm mandrel |
| Cold Impact | FLTM BO 151-02, 35° C., 90° pendulum angle | Rating 0 max |
| Resistance to Abrasion | SAE J948 Taber, 250 cycles, 500 gram weight, CS10 wheels | Must be compatible with the unabraded adjacent area |
| Resistance to Scuffing | SAE J365 250 cycles | No evidence of lifting, peeling or excessive scuffing. Must be compatible with adjacent unscuffed area |
| Resistance to Marring | SAE J365 10 cycles | No severe change in gloss, mar can be removed with 4 rubs of the thumb across mar |
| Resistance to Scratching | FLTM BN108-13 | Rating 1 max at 2N with 1 mm Rating 1 max at 2N with 7 mm |
| Specific Gravity | ASTM D792 | |

| Sample No. | 1 | 3 | 5 |
|---|---|---|---|
| Skin Thickness | Thickness, mm: 1.00 | Thickness, mm: 1.02 | Thickness, mm: 1.08 |
| Hardness Shore "A" (ASTM D2240) | Mean: 70 | Mean: 68 | Mean: 79 |
| Tear Strength (ASTM D624) kN/M Die C | Mean: 31.4 | Mean: 28 | Mean: 29 |
| Tensile Strength at maximum load (d3574 MPa | Mean: 4.4 | Mean: 4.6 | Mean 4.4 |
| Elongation at break | Mean: 200 σ 19 | Mean: 230 σ 28 | Mean: 206 σ 17 |
| Resistance to Heat Aging Color Stability(AATCC color test) | Rating: 5 ΔE: 0.581 Δb: 0.042 | Rating: 5 ΔE: 0.712 Δb: 0.710 | Rating: 4-5 ΔE: 0.512 Δb: 0.500 |
| Cold Flexibility Elongation at break | No cracks (0%) Mean: 200 σ 3.6 Original: 200 | No cracks (−8.69%) Mean: 210 σ 27 Original: 230 | No cracks (−44%) Mean: 115 Original: 206 |
| 3.7.7 Fogging | 1 h 90(94, 95, 82) Droplets throughout 16 h 99(99, 98, 98) Droplets around edges | 1 h 94(96, 94, 93) Droplets & iridescence 16 h 99(99, 98, 98) Droplets | 1 h 97(97, 98, 96) Slight fog 16 h 98(98, 98, 97) Slight fog |
| Resistance to Fade, SAE J1885 | 489 kJ Sample 1 ΔE: 0.855 Sample 2 ΔE: 0.834 | 489 kJ Sample 1 ΔE: 0.302 Sample 2 ΔE: 0.234 | 489 kJ Rating: 4-5 489 kJ Rating: 4-5 489 kJ ΔE: 0.141 489 kJ ΔE: 0.141 489 kJ Db: −0.003 489 kJ Db: −0.160 |
| Mandrel Bend after 489 kJ | No cracks | No cracks | No cracks |
| Resistance to Fade | 1504 kJ Sample 1 ΔE: 0.589 Sample 2 ΔE: 0.682 | 1504 kJ Sample 1 ΔE: 0.401 Sample 2 ΔE: 0.417 | 1504 kJ Sample 1 ΔE: 0.245 Sample 2 ΔE: 0.264 |
| Mandrel Bend after 1504 kJ | | | No cracks |
| Cold Impact | Rating: 0 | Rating: 0 | Rating: 0 |
| Resistance to Abrasion | Sample compatible with the unabraded adjacent area | Sample compatible with the unabraded adjacent area | Sample compatible with the unabraded adjacent area; slight color transfer from wheels; grain is intact |
| Resistance to Scuffing | Evidence of excessive scuffing. Sample is not compatible with adjacent unscuffed area. | Sample is not compatible with adjacent unscuffed area; scufffing is not excessive | Sample is not compatible with adjacent unscuffed area; lifting and peeling |

TABLE 2-continued

| | Physical properties. | | |
|---|---|---|---|
| Resistance to Marring | No change in gloss, mar can be removed with 4 rubs of the thumb across mar | No change in gloss; mar can be removed with 4 rubs of the thumb across mar | No apparent change from original state |
| Resistance to Scratching | 2N Rating 1 mm: 1 2N Rating 7 mm: 1 | 2N Rating 1 mm: 1 2N Rating 7 mm: 1 | 2N Rating 1 mm: 1 2N Rating 7 mm: 1 |
| Specific Gravity | 1.06 | 1.05 | 1.042 |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An instrument panel skin comprising:
residues of a urethane-based resin composition consisting essentially of a urethane elastomer composition and a propylene-ethylene copolymer, the thermoplastic urethane elastomer composition having a polyether polyol, a chain extender, an organic diisocyanate, a hindered amine light stabilizer, a pigment, and a benzotriazole ultraviolet stabilizing agent, wherein the propylene-ethylene copolymer has a total crystallinity less than about 20% and the propylene-ethylene copolymer has a flexural modulus (1% secant) from about 1500 psi to about 2500 psi and wherein the propylene-ethylene copolymer is present in an amount from about 1 to 25 weight percent of the urethane-based resin composition.

2. The instrument panel skin of claim 1 wherein the propylene-ethylene copolymer is present in an amount from about 5 to 20 weight percent of the urethane-based resin composition.

3. The instrument panel skin of claim 1 wherein the propylene-ethylene copolymer is present in an amount from about 10 to 15 weight percent of the resin composition.

4. The instrument panel skin of claim 1 wherein the propylene-ethylene copolymer has a Shore A hardness from about 40 to about 80.

5. The instrument panel skin of claim 1 wherein the polyol has less than about 0.04 meq/g terminal unsaturation.

6. The instrument panel skin of claim 1 wherein the polyol is present in an about of about 40 to 70 weight percent of the urethane elastomer composition.

7. The instrument panel skin of claim 1 wherein the isocyanate is present in an about of about 20 to 50 weight percent of the urethane elastomer composition.

8. The instrument panel skin of claim 1 wherein the urethane based resin composition further includes at least one antioxidant or a residue thereof.

9. The instrument panel skin of claim 1 having at least one textured surface.

* * * * *

UNITED STATES PATENT AND TRADEMARK OFFICE
CERTIFICATE OF CORRECTION

PATENT NO. : 7,833,623 B2  
APPLICATION NO. : 12/103526  
DATED : November 16, 2010  
INVENTOR(S) : William McHugh Humphrey, Jr. et al.

Page 1 of 1

It is certified that error appears in the above-identified patent and that said Letters Patent is hereby corrected as shown below:

Column 9, Line 28, Claim 1:

After "copolymer, the"  
Delete "thermoplastic".

Column 10, Line 28, Claim 6:

After "present in an"  
Delete "about" and insert -- amount --.

Column 10, Line 31, Claim 7:

After "present in an"  
Delete "about" and insert -- amount --.

Signed and Sealed this  
Fifteenth Day of March, 2011

David J. Kappos  
*Director of the United States Patent and Trademark Office*